United States Patent Office 2,707,401
Patented May 3, 1955

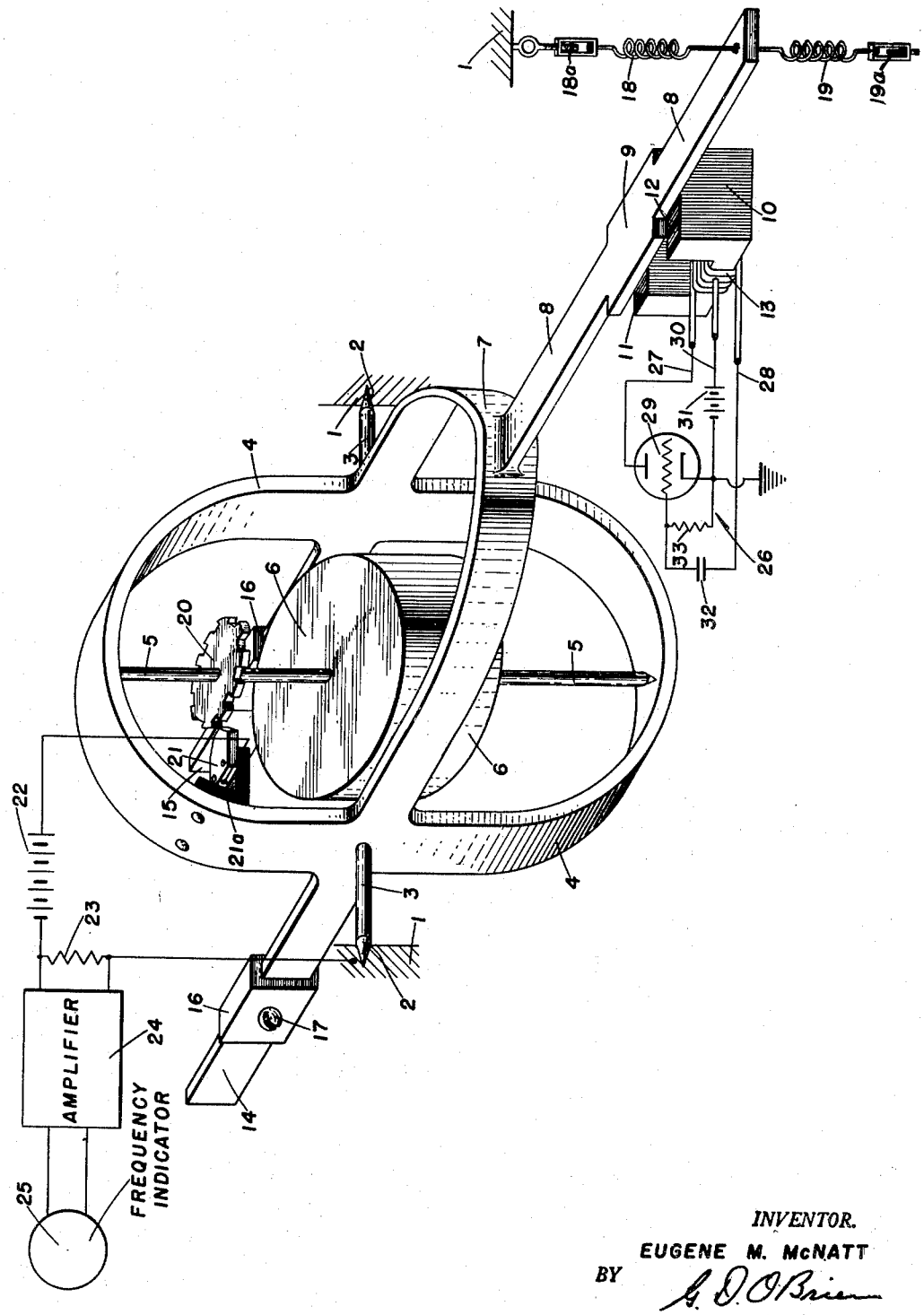

2,707,401
ROLL RATE INDICATOR FOR GUIDED MISSILE TESTING

Eugene M. McNatt, Tulsa, Okla., assignor, by mesne assignments, to the United States of America as represented by the Secretary of the Navy Application December 2, 1949, Serial No. 130,694

1 Claim. (Cl. 74—5.6)

The present invention relates to apparatus for indicating the rate of roll of a vehicle, such as a ship, airplane, missile and the like. More specifically, it relates to improved means for indicating the roll rate of a guided missile, carrying such apparatus. The invention relates also to an auxiliary device, for indicating the speed of spin of a gyroscope rotor forming part of said apparatus.

In controlling the flight of guided missiles it is usually desirable that such missiles be free from rolling, in order that horizontal and vertical control signals may be transmitted correctly to said missiles to provide non-interfering separate controls. This in turn makes it desirable to provide apparatus for indicating the rate of roll of such missiles, to assist in their testing and development. Inasmuch as such missiles are not accessible for testing while in flight, recourse is usually had to the expedient of causing the missile to emit radio signals modulated in accordance with the angle of roll, to be received at a suitable station on the ground. The present invention relates to one form of apparatus that may be used for such purpose.

An object of the invention, therefore, is to provide a relatively simple means for indicating roll rate, by means of a gyroscope and associated apparatus.

More specifically, an object is to utilize a gyroscope carried by the vehicle under test, and having only one degree of freedom, to provide the desired indications by precession of the gyroscope against a resilient restraint, and measurement of the resultant deflection.

Inasmuch as the amount of precession is a function also of the spin-speed of the gyroscope rotor, a secondary object of the invention is to provide apparatus for measuring such spin-speed and converting the said measurements into electrical signals.

Other objects and many of the attendant advantages of this invention will be appreciated readily as the same becomes understood by reference to the following detailed description, when considered in connection with the accompanying drawing, wherein the single figure is a diagrammatic perspective view illustrating the structure and the electrical circuits that may be used in practising the invention.

Referring to said drawing, fragments of the missile wall are indicated at 1, 1. This wall supports a gimbal ring 4 by means of shaft sections 3, 3 having pivots 2, 2 journalled in said wall.

A gyroscope rotor 6 is mounted on a shaft 5, whose ends are pivotally mounted in the gimbal ring 4 and whose axis of rotation is perpendicular to the axis of shaft sections 3, 3. It will be understood that in practice, anti-friction bearings will be provided, but for the purpose of the present invention, which does not concern the mechanical details of the gyroscope, these bearings as well as many other refinements are omitted. A toothed metal disk 20 is mounted on and electrically connected to shaft 5, and partakes of the spin of the rotor 6, for a purpose that is disclosed hereinafter.

A bail 7 may be provided, secured to or integral with the gimbal ring 4, located in the general plane passing through the shaft sections 3, 3 and extending at right angles to the axis of shaft 5. This bail is provided with a centrally located arm 8 also in the said general plane, and either made wholly of magnetic material or having a portion 9 consisting of such material, to act as part of a magnetic circuit to be described below.

Preferably the arm 8 extends beyond the portion 9 and serves as an attachment for springs 18 and 19, whose other ends are mounted on relatively stationary portions of the missile wall 1. Turnbuckles 18a and 19a are provided to adjust the tensions of these springs. In order to counterbalance the weight of the bail 7 and arm 8, additional oppositely directed arms 14 and 15 may be carried by the gimbal ring 4. Counterweights 16, 16 are provided on these arms, and may be shifted along said arms as required and then secured in adjusted position, as by set screws 17. This completes the description of the movable structure, except for parts 21 and 21a, carried by gimbal 4, which are discussed later.

Coacting with said movable structure is a stationary core 10 of magnetic material, preferably laminated as shown. This core terminates in two plane surfaces 11 and 12, adjacent the portion 9 of arm 8, thus completing a magnetic circuit, with two air gaps, between said portion 9 and the pole faces 11 and 12 respectively. A winding 13, having its terminals 27 and 28 connected to the anode and control grid respectively of a thermionic tube 29, and an intermediate tap 30 connected to the cathode of said tube, provides the inductances for an oscillation producing circuit 26. This is here illustrated as of the Hartley type.

An energy source 31 is interposed between the cathode and the tap 30 and an isolating capacitor 32 is inserted between the terminal 28 and the control grid, to keep the direct current voltage of the source 31 out of the grid circuit, while providing only a relatively small impedance to the oscillations generated in the circuit. A suitable grid leak 33 completes the oscillation generator.

In operation, the inductances of winding 13, and of its two sections formed by the tap 30, will be caused to vary when the armature 9 moves relatively to the pole faces 11 and 12, thus changing the air gaps. This will cause the frequency of the oscillations to vary accordingly.

The movement of the armature 9 is caused by precession of the gyroscope whenever the orientation of the vehicle carrying the latter is changed. Such precession, however, is limited by the springs 18 and 19, which preferably have conventional means, diagrammatically shown as turnbuckles, for adjusting their respective tensions. Thus the position of the armature 9 relative to the pole faces 11 and 12 may be adjusted and likewise the stiffness of response may be varied, to suit any given conditions. Usually, it is desirable to limit the motion of the armature 9 to a relatively small range, which is accomplished by providing correspondingly great tension in the springs.

Inasmuch as it is necessary to know the rate of spin of the rotor, a simple electrical circuit has been provided to give this information. It comprises the toothed metal disk 20 already mentioned, and a relatively stationary metal plate 21 mounted on the insulating bracket 21a supported by the gimbal 4 and thus insulated from said gimbal. Plate 21 has its free end close to the ends of the teeth of the disk, and so alined with said disk that during rotation of the latter the said end will alternately be close to a tooth and to a space between successive teeth, thus constituting a periodically varying capacitance. The capacitance thus produced is, of course, very small, but is adequate for frequency measurement, when a suitable amplifier is provided.

The circuit comprises a source 22 of direct current energy, having one terminal connected directly to the insulated plate 21 and the other terminal connected to the missile wall 1, and thus to the disk 20, through a series resistor 23. As the capacitance varies rapidly, upon spinning of the disk 20, an alternating current will flow through the resistor 23, producing an alternating voltage at the terminals of the resistor, serving as an input for the amplifier 24.

This voltage has a frequency proportional to the spin rate of the rotor 6. After amplification this will suffice either to operate a frequency indicator 25 or, if desired, to modulate a radio signal emitted by the transmitter usually carried by the test missile as standard equipment.

It will be noted that no means for imparting spin to the rotor 6 have been disclosed. Any conventional means may be used for this purpose, such as electric or compressed air motors. However, it is also possible to bring the rotor up to a suitable speed by independent external means, that is, by means which are associated operatively with the rotor only immediately before a test is to be made, so that the rotor will be spinning solely by its own momentum while the measurements are in progress, thus simplifying the apparatus, and reducing its bulk, weight and cost. Whatever the means used, such means do not constitute any part of the present invention and hence are not further described herein.

Obviously many modifications and variations of the present invention are possible in the light of the above teachings. It is therefore to be understood that within the scope of the appended claim the invention may be practiced otherwise than as specifically described.

What is claimed is:

A roll rate indicator for an aerial vehicle comprising a gimbal ring rotatably mounted in said vehicle, said gimbal ring having its axis of rotation normal to the direction of travel of the vehicle, a gyroscope rotor mounted in said gimbal ring, the spin axis of said rotor being normal to both the direction of travel of the vehicle and the axis of rotation of the gimbal support, a bail projecting laterally from said gimbal ring, an arm including magnetic material projecting from said bail, whereby said bail and said arm are adapted to rotate with said gimbal ring, resilient means attached to said arm for restraining the rotation of said gimbal ring, adjustable weights carried by said gimbal ring for counterbalancing the weight of the bail and the arm of magnetic material, a core of magnetic material mounted adjacent said arm, and an inductance winding on said core, whereby the roll of said aerial vehicle will cause said gyroscope rotor to precess thereby moving said gimbal and arm of magnetic material with respect to said winding to vary the inductance of the latter to provide indications of the roll rate of said vehicle.

References Cited in the file of this patent

UNITED STATES PATENTS

| | | |
|---|---|---|
| 2,089,987 | Urfer | Aug. 17, 1937 |
| 2,104,226 | Gonzales | Jan. 4, 1938 |
| 2,242,253 | Lyman | May 20, 1941 |
| 2,443,668 | Tagg | June 22, 1948 |
| 2,455,939 | Meredith | Dec. 14, 1948 |
| 2,473,542 | Philpott | June 21, 1949 |
| 2,514,250 | Meredith | July 4, 1950 |
| 2,537,844 | Meredith | Jan. 8, 1951 |

FOREIGN PATENTS

| | | |
|---|---|---|
| 630,657 | Great Britain | Oct. 18, 1949 |